United States Patent [19]

Kliman et al.

[11] Patent Number: 4,859,885
[45] Date of Patent: Aug. 22, 1989

[54] WINDING FOR LINEAR PUMP

[75] Inventors: Gerald B. Kliman, Schenectady, N.Y.; Glen V. Brynsvold, San Jose, Calif.; Thomas M. Jahns, Schenectady, N.Y.

[73] Assignee: General Electric Company, San Jose, Calif.

[21] Appl. No.: 202,989

[22] Filed: Jun. 6, 1988

[51] Int. Cl.[4] .................. H02K 44/04; H02K 44/08
[52] U.S. Cl. ......................................... 310/11; 417/50
[58] Field of Search ............................. 310/11; 417/50

[56] References Cited

U.S. PATENT DOCUMENTS 4,177,015 12/1979 Davidson .............................. 417/50
4,557,667 12/1985 Delassus et al. ...................... 310/11

OTHER PUBLICATIONS

Krauya, V. M., Regulation of the Head of a Liquid-Metal Induction Pump, Magnetohydrodynamics, (U.S.A.), vol. 7, No. 2, pp. 216-220, Apr.-Jun. 1971.
Dudley, A. M., Connecting Induction Motors, McGraw-Hill Book Co., Inc., 1921, pp. 32-33.

Primary Examiner—Patrick R. Salce
Assistant Examiner—Judson H. Jones
Attorney, Agent, or Firm—Robert R. Schroeder

[57] ABSTRACT

A winding and method of winding for a submersible linear pump for pumping liquid sodium is disclosed. The pump includes a stator having a central cylindrical duct preferably vertically aligned. The central vertical duct is surrounded by a system of coils in slots. These slots are interleaved with magnetic flux conducting elements, these magnetic flux conducting elements forming a continuous magnetic field conduction path along the stator. The central duct has placed therein a cylindrical magnetic conducting core, this core having a cylindrical diameter less than the diameter of the cylindrical duct. The core once placed to the duct defines a cylindrical interstitial pumping volume of the pump. This cylindrical interstitial pumping volume preferably defines an inlet at the bottom of the pump, and an outlet at the top of the pump. Pump operation occurs by static windings in the outer stator sequentially conveying toroidal fields from the pump inlet at the bottom of the pump to the pump outlet at the top of the pump. The winding apparatus and method of winding disclosed uses multiple slots per pole per phase with parallel winding legs on each phase equal to or less than the number of slots per pole per phase. The slot sequence per pole per phase is chosen to equalize the variations in flux density of the pump sodium as it passes into the pump at the pump inlet with little or no flux and acquires magnetic flux in passage through the pump to the pump outlet.

6 Claims, 4 Drawing Sheets

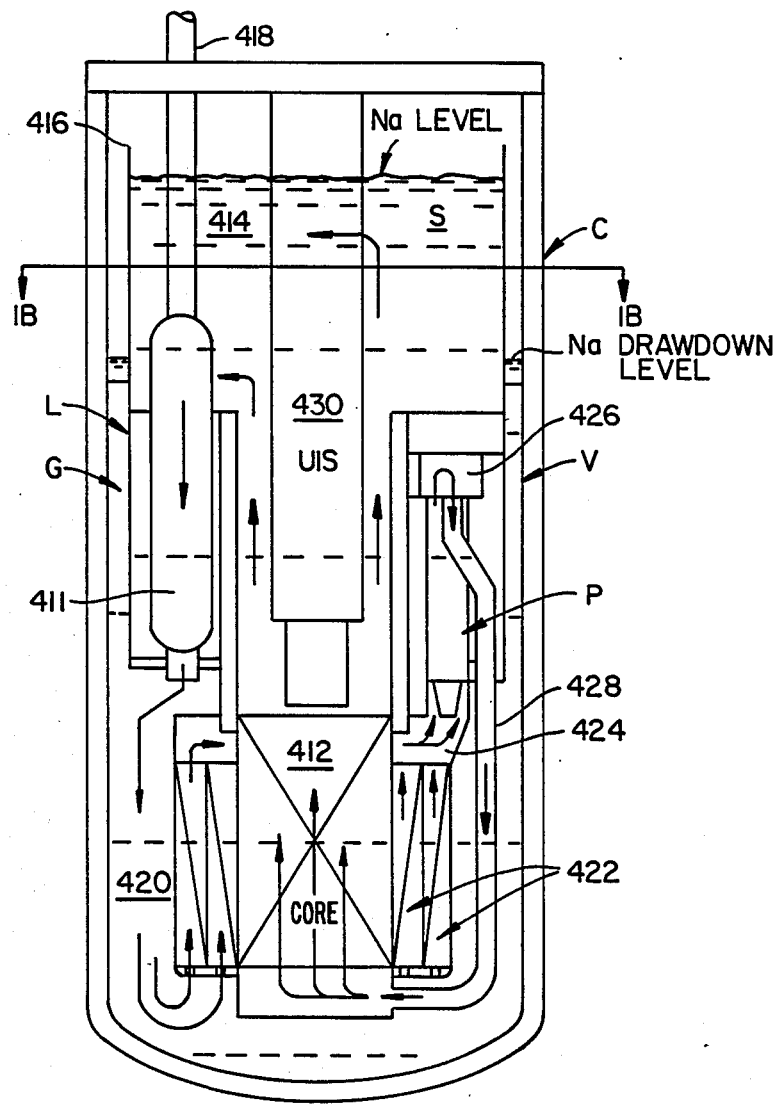
FIG._1A. (PRIOR ART)

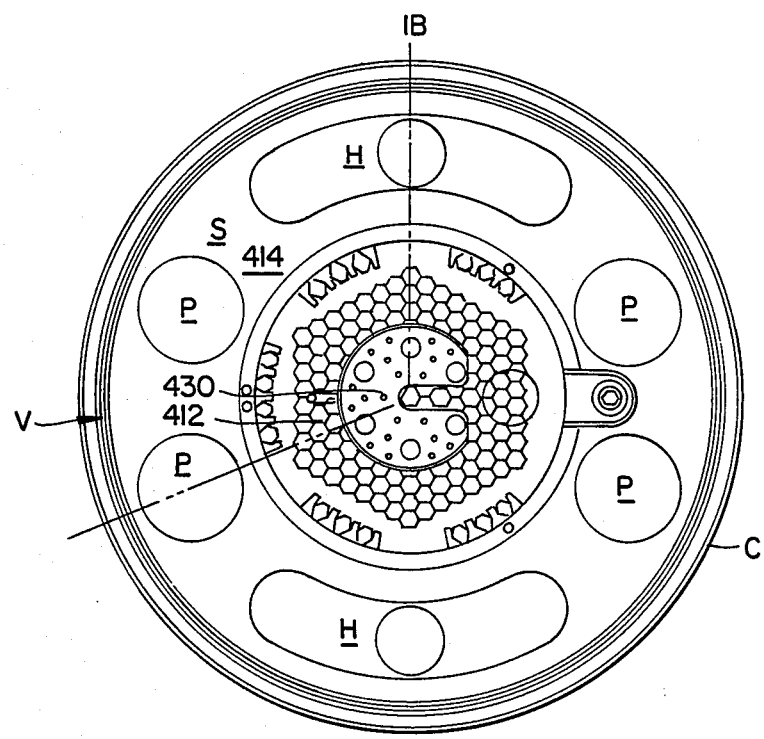
FIG._1B. (PRIOR ART)

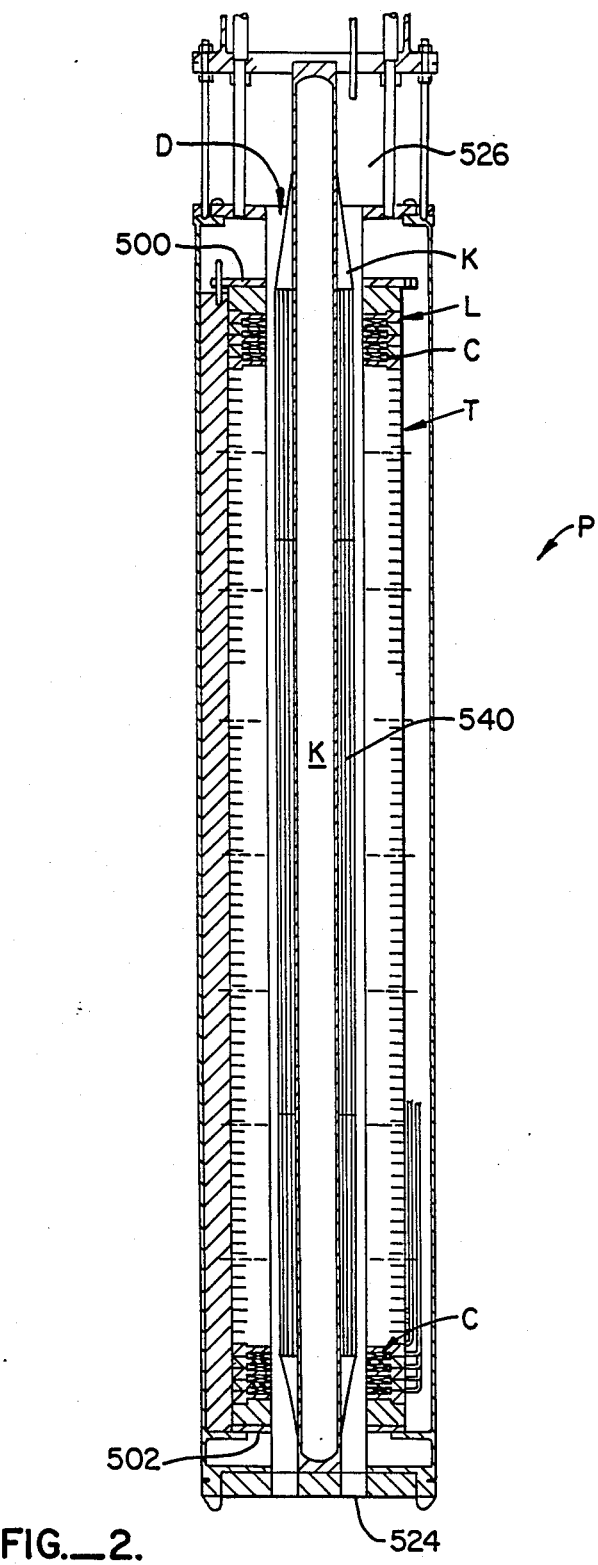
FIG._2.

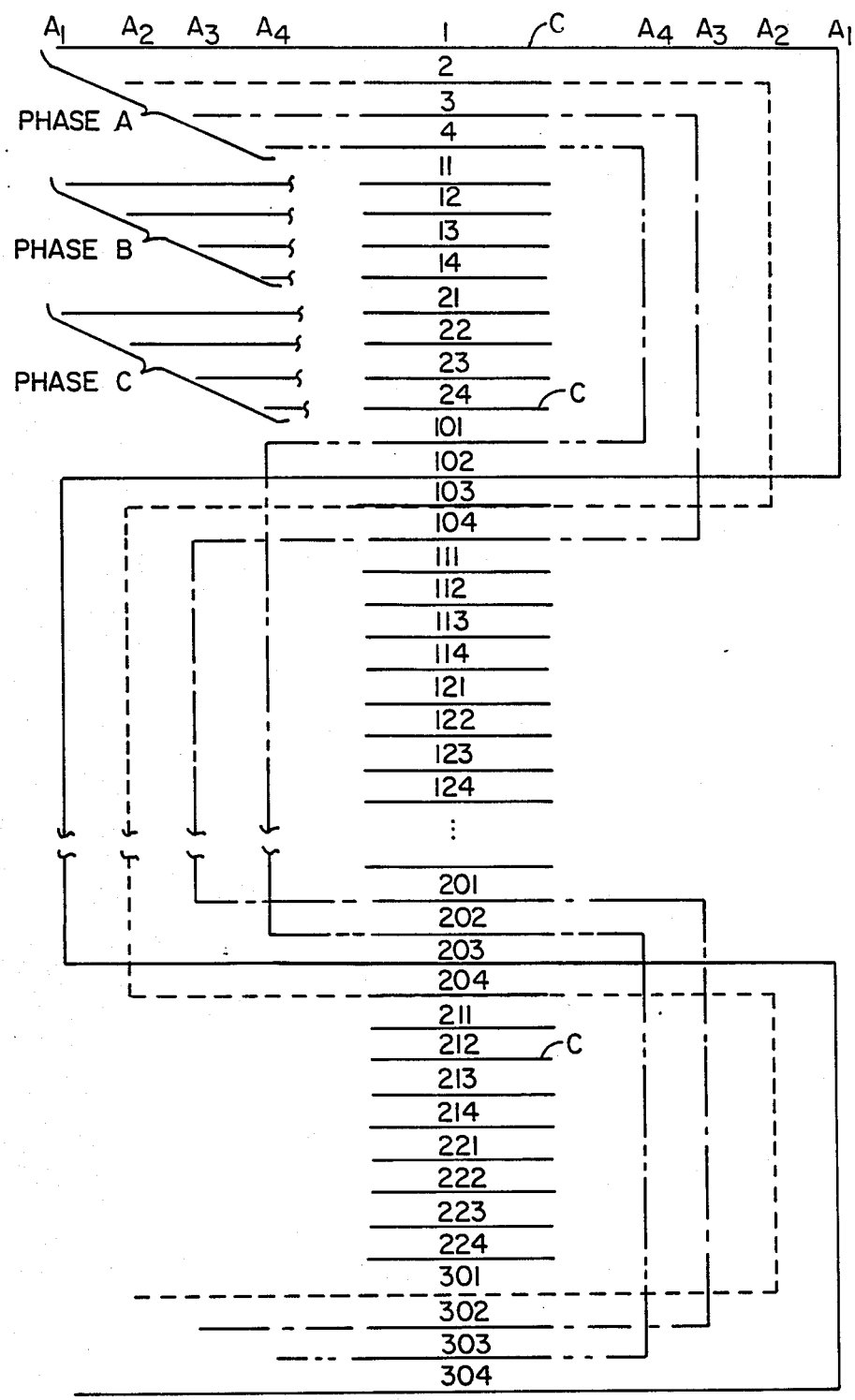
FIG._3.

WINDING FOR LINEAR PUMP

BACKGROUND OF THE INVENTION

The United States Government has rights in this invention pursuant to Contract No. DE-ACO-85NE37937 awarded by the U.S. Department of Energy.

This invention relates to linear stators, for example, submersible liquid sodium pumps. More particularly, a wiring sequence is disclosed to minimize changes in flux density and phase angle in parallel legs utilized within a liquid sodium pump.

SUMMARY OF THE PRIOR ART

Liquid sodium pumps are known. Typically these pumps are not submersible and placed in the so-called "cold legs" of sodium cooled nuclear reactors. The pumps may best be understood by referring first to their physical configuration, second to their operating characteristics, and finally to the problem of insulating the windings of such pumps in the high temperature environment of a submersible sodium pump.

Thereafter a brief reference will be made to motors to emphasize the difference between rotor and stator of a motor with the pumped sodium and stator of this invention.

The physical configuration of such liquid sodium pumps can easily be understood. Typically, a cylindrical stator is provided. This cylindrical stator has a concentric cylindrical duct. This duct defines a cylindrical aperture in the stator.

The duct is surrounded by coils and laminates for respectively generating rapidly changing magnetic fields and conducting these rapidly changing magnetic fields along the length of the core. The coils are discretely aligned along the length of the pump. They are disposed in the stator and around the cylindrical central duct.

The magnetic core conducting laminates extend between the coils so as to hold the coils sandwiched therebetween. These magnetic core conducting laminates, like the coils, extend around the central duct. The magnetic core conducting laminates with the coils sandwiched in between, extend the entire length of the stator around the central duct.

A central magnetic field conducting core is concentric to the duct. This core is smaller than the cylindrical dimension of the duct. It therefore defines with the duct a cylindrical interstitial pumping volume.

Assuming that the pump is aligned vertically and pumps sodium from the bottom of the pump to the top of the pump, the pump has a lower inlet and an upper outlet.

The case of a toroidal magnetic field within the core can be readily understood. Typically, one vertical side of the toroidal field is in the stator. The other and inner vertical side of the toroidal field is in the central magnetic field conducting core. The field typically crosses the interstitial cylindrical pumping volume in two places. This occurs at the top of the field and at the bottom of the field. It is the magnetic field crossing the interstitial pumping gap at the top and the bottom which interacts with the sodium of the pump to cause pumping.

The coils are connected in phases to a three phase power supply. The power supply is for the purpose of continuously conveying the magnetic fields from the bottom of the pump to the top of the pump. Just as fields in a motor continually rotate and cause sympathetic rotation of the rotor, the fields in the linear pump continuously translate entraining through interaction with the highly conductive sodium to cause sympathetic movement of the sodium.

In short, the fields convey along the stator and central core from the inlet to the outlet. The sodium is likewise conveyed along the central core from the inlet to the outlet.

The windings of liquid sodium pumps inevitably generate resistance heating. This resistance heating must be conveyed away from the windings in order that the windings can operate at a proper temperature. At the same time, the windings cannot conveniently operate at a temperature lower than the liquid sodium to be pumped. For this reason, such pumps are typically disposed in the "cold legs" of nuclear reactors.

The term "cold leg" is relative. Cold legs of nuclear reactors have temperatures in the range of 600° F.

It has been proposed in the past to connect such windings in series. Unfortunately, such series connections require high voltages. That is to say, each coil of every pole related to every phase must be connected in series along the entire length of the pump. High voltages are generated with respect to ground and across the coils.

Unfortunately, known insulations which can survive the operating temperatures of sodium pumps have relatively low dielectric values. That is to say, these insulators are not capable of insulating the high voltages needed for series winding of such pumps.

In order to reduce the voltage to a level that can be tolerated by high temperature insulations, it has been suggested to wire such pumps in parallel windings. While this would naturally reduce the voltage utilized to drive the pump, two other problems have been identified in the prior art, but not solved.

Paramount of these problems is the varying flux density of the sodium as it passes through the pump. This may best be understood by comparing the sodium pump to an electric motor.

In an electric motor with a rotating rotor, the flux density of the rotor initially varies when the motor is started. The rotor starts with an initial low flux. When subjected to a magnetic and rotating field, the rotor acquires flux and eventually becomes saturated. Thereafter, the rotor follows the rotating field with the exception of slippage.

In the case of the motor, and the central rotating core, the variations in flux density of the rotor are uniformly distributed to the stator and its rotating electrical field at all times. All parts of the stator see at any given instance substantially the same flux emanating from the rotating core of the motor.

Unfortunately, liquid sodium pumps constitute a radical departure from motor stator and rotor considerations.

When sodium initially enters the inlet of a linear pump, the highly conductive sodium is the equivalent of the rotating core of a motor just as the rotor starts to rotate responsive to the field of the stator. Flux is low and is being accumulated by the entering sodium.

When the sodium has progressed into the motor, the sodium becomes analogous to the rotor of a motor saturated with flux. That is to say, as the sodium proceeds through the linear pump, its flux density changes. And with the change in flux density comes corresponding changes in the flux response of the coil elements causing the sodium to move through the pump.

The discrete phases also constitute a problem. Typically, there are provided multiple coils per phase per pole along the length of the stator. Adjacent coils in the same phase of the same pole have differing phase angles. Thus, the linear sodium pump super imposes the problem of differing phase angle on top of differing flux.

The prior art recognized the phase flux problem. Hereto, the prior art has not disclosed how linear pumps can be effectively wound to incorporate parallel windings with low enough driving voltages that can be resisted by known and developing insulations at high temperatures.

SUMMARY OF THE INVENTION

A winding and method of winding for a submersible linear pump for pumping liquid sodium is disclosed. The pump includes a stator having a central cylindrical duct preferably vertically aligned. The central vertical duct is surrounded by a system of coils in slots. These slots are interleaved with magnetic flux conducting elements, these magnetic flux conducting elements forming a continuous magnetic field conduction path along the stator. The central duct has placed therein a cylindrical magnetic flux conducting core, this core having a cylindrical diameter less than the diameter of the cylindrical duct. The core once placed to the duct defines a cylindrical interstitial pumping volume of the pump. This cylindrical interstitial pumping volume preferably defines an inlet at the bottom of the pump, and an outlet at the top of the pump. Pump operation occurs by static windings in the outer stator sequentially conveying toroidal fields from the pump inlet at the bottom of the pump to the pump outlet at the top of the pump. The winding apparatus and method of winding disclosed uses multiple slots per pole per phase with parallel winding legs on each phase equal to or less than the number of slots per pole per phase. The slot sequence per pole per phase is chosen to equalize the variations in flux density of the pump sodium as it passes into the pump at the pump inlet with little or no flux and acquires magnetic flux in passage through the pump to the pump outlet. Accordingly, parallel legs for each phase servicing discrete poles along the length of the pump are disclosed in which a slot in each pole per phase extending the entire length of the pump is selected to equalize the flux density on each parallel leg of the winding. Likewise, the parallel legs also include symmetrically permuted slots in each pole per phase to equalize phase angle shifts between the slots of each pole at each phase in each leg. Conventional high voltage series connection of all the poles is avoided with the beneficial result that coil voltages are reduced and insulating materials of lower dielectric rating can be used in the high temperature environment of liquid sodium pumps.

Other Objects, Features and Advantages

An object of this invention is to set forth the design criteria for equalizing the varying flux along the length of windings for slots of a linear stator used in a submerged liquid sodium pump. Accordingly, parallel legs for each phase are selected that are equal to or less than the number of slots per pole per phase. These parallel legs include at least one slot from each pole along the entire length of the pump. By this inclusion, variations in flux density can be substantially equalized in each parallel leg.

An advantage of the inclusion of a slot from each pole is that even though the flux varies in the sodium as it passes throughout the length of the linear pump, the additive flux on each parallel leg of a discrete winding will be approximately the same. Thus, parallel legs will be equalized with respect to the variation of flux density in the cylindrical pumping volume of the pump. Recirculating currents between parallel connected legs will be minimized.

A further object to this invention is to equalize phase angle distribution of the discrete parallel legs utilized in the pump. According to this aspect of the invention, each phase of each pole of the pump includes a repeating sequence of windings or slots. Each parallel leg on each phase is selected to include a permuted sequence of slots from each pole such that the sequential distribution of slot sequence is the same for each parallel leg.

An advantage of this permuted sequence is that phase angle differences between adjacent windings in each pole are likewise equalized. Thus, with both flux density changes equalized and phase angle changes equalized, discrete parallel legs within each phase are possible for the powering of the pump.

An advantage of the overall design is that for the first time a large linear pump can be powered through parallel circuits to reduce the required driving voltage and render effectual insulations which are exposed to the high temperatures of pumped sodium.

BRIEF DESCRIPTION OF THE DRAWINGS

Other objects, features, and advantages of this invention will become more apparent after referring to the following specification and attached drawings in which:

FIG. 1A is a side elevation section of a prior art sodium cooled reactor illustrating the sodium flow loop during normal reactor operation and illustrating the location of the sodium pump of this invention within the so-called "cold leg" of a sodium loop;

FIG. 1B is a plan view of the reactor of FIG. 1A taken along lines 1B—1B of FIG. 1A to show the placement of the four pumps in accordance to this disclosure within a single sodium cooled reactor;

FIG. 2 is a side elevation section of a pump having 96 coil units sandwiched between 97 ring laminate constructions, the coil units being connected in parallel in accordance with the teachings of this disclosure to a three phase 15 Hertz 700 volt power supply (for example) to generate in the stator serially upwardly conveyed magnetic fields for entraining the sodium from the bottom inlet of the pump to the top outlet of the pump; and FIG. 3 is a wiring schematic illustrating the principle of the wiring set forth herein. Referring to FIG. 1A, a sodium reactor is enclosed within a containment vessel C in a reactor vessel V. As is common in the art, containment vessel C is closely spaced to the reactor vessel V and is capable of containing liquid sodium S in the case of a rupture of the reactor vessel V.

The components of the reactor and the placement of the pumps can best be understood by tracing the sodium coolant flow path and at the same time describing the component parts.

Continuing with FIG. 1A and remembering that the reactor is undergoing normal power operation, core 412 passes sodium S and discharges the heated sodium S into a hot pool 414. Hot pool 414 is confined to the interior of the reactor by a vessel liner L. Vessel liner L extends partially the full height of the reactor V terminating short at the top of the reactor V at 416. This termination is part of a cool down feature of the reactor which is not important to this invention and consequently will not be further herein discussed.

Sodium from hot pool 414 enters into intermediate heat exchanger H and dissipates heat. Heat is dissipated through secondary sodium circuits schematically labeled 418 which passes typically back to a steam generating heat exchanger and thereafter back into the reactor in a continuous loop. Conventional power generation utilizing the secondary sodium loop and generated steam will not be set forth.

After heat exchanged flow induced pressure drop across the heat exchanger H, the liquid sodium passes to a cold pool 420. Cold pool 420 is at a lower hydrostatic pressure than hot pool 414 because of the pressure drop through the heat exchanger H. Cold pool 420 outflows through a fixed shield cylinders 422 to the inlet 424 of the main reactor pumps P. These reactor pumps are the pumping devices set forth in the disclosure herein.

Typically, reactor pumps P are of the electromagnetic variety. These pumps P have a low pressure bottom inlet 424, a high pressure upper outlet 426. Sodium outlet through high pressure outlet 426 passes through pump discharge 428 to the inlet of core 412. This completes the sodium circuit.

The reactor cold pool is maintained at a sightly lower pressure (about 4 psi) from the reactor hot pool during normal operation. The temperature of the reactor cold pool is the order of 600° F. The necessary control rods enter from and are withdrawn to a control rod plenum 430. Since the control rods do not constitute a part of this invention, they will not be discussed further.

The reader will also understand that FIG. 1A and its accompanying section in FIG. 1B are an over simplification of the sodium cooled reactor. In actual practice the reactor includes two kidney shaped section heat exchangers H and four pumps P (see FIG. 1B). General dispositions of the pumps P and the heat exchanger H can be understood upon studying FIG. 1B.

It will further be understood that section of FIG. 1A is for the purposes of understanding. It will be understood that it is desirable to pump sodium in the secondary loop as well. This secondary loop is into and out of the intermediate heat exchanger H by piping not shown. Again, on the cold leg of such piping a submerged sodium pump or pumps P similar to the construction herein will be utilized.

Having set forth the environment of the sodium cooled reactor and the placement of four pumps of the invention therein, attention can now be turned to the construction of the pump illustrated in FIG. 2.

Referring to FIG. 2, a pump P is illustrated. The pump includes an outer stator T and an inner central core K.

Stator T includes a central duct D surrounded along its entire length by two alternating constructions. A first of these constructions are a group of magnetic laminate rings L. Laminate rings L serve two functions in the pump.

First, the laminate rings L conduct a magnetic field along the length of the stator T.

Second, the laminate rings L key rigidly to the central duct D of the stator. In such keying, the laminate rings perform two additional purposes.

First, the laminate rings L resist dynamic loadings of the sodium through the magnetic field to the pump. By being rigidly keyed to the duct D, vibrational movement and wear is prevented.

Second, the laminate rings D serve to conduct resistance heating away from the coils utilized in the pump. This heating is conducted from the coils to the laminate rings L and thereafter to and through the duct D to the passing sodium.

It will be appreciated that the passing sodium is hot (in the range of 600° F.). This being the case, the coils will be of even greater temperature. Operating temperatures at the coils in the range of 1,000° F. are contemplated.

Sandwiched in between the laminate constructions L are the coils C. These respective coils C comprise bands of spirally wound copper. As is conventional, these bands can be wound one in hand, two in hand, three in hand, etc., dependent upon the construction of the pump.

Placed centrally of the duct D is a magnetic conducting core K. Core K includes a laminate wall construction 540. The function of the laminate wall construction, like the function of the laminate rings L is for the conduction of magnetic fields.

Typically, the windings will be wired for the conduction of the magnetic fields from the inlet of pump 524 to the outlet of the pump 526. The magnetic field will typically be toroidal.

One vertical leg of each toroidal magnetic field will be conducted in laminate rings L. This will be the vertical outwardly and cylindrical portion of the toroidal magnetic field.

The other vertical legs of each toroidal magnetic field will be conducted in the laminates 540 of the central core K.

The toroidal magnetic fields will bridge the gap of the cylindrical interstitial pumping volume defined between duct D and the outside of core K. It is in this portion of the field that induced pumping of liquid sodium interior of the pump will occur.

Referring to FIG. 2, the problem of the nonuniform flux distribution can be understood.

Typically, sodium upon entering the pump at inlet 524 will not be possessed of appreciable flux. It will see the magnetic fields initially imposed by the coils C. Upon seeing this field, the sodium will start to pick up flux in a gradual manner. The sodium will resist the imposition of flux as provided by Lenz's law.

Approximately half way through the pump, the liquid sodium will be saturated with the flux. It is this gradual increase of flux density of the passing sodium that creates the primary problem solved by this invention. This variation in flux density renders the windings of this invention nonanalogous to flux problems experienced in conventional rotating motors.

Typically, the pump of FIG. 2 is over 15 feet in length. It includes 96 discrete coils trapped between 97 ring laminates L.

A preferred construction includes 8 discrete poles distributed along the length of the pump. Thus, each pole will include 12 windings.

Further, and since a three phase power supply is used, there will be four windings per phase per pole. Having said this much, and now turning to FIG. 3, the invention can be understood.

Typically, in FIG. 3, the poles of the coils C are schematically labeled. A first pole in the pump is shown having coils 1, 2, 3, and 4 in phase A; coils 11, 12, 13, and 14 in phase B; coils 21, 22, 23, and 24 in phase C.

Looking at the first phase of the first pole, the first phase has four coils attributable to it. Those coils are coils 1, 2, 3, 4.

Turning to the second pole, the twelve discrete coils are labeled, coils 101, 102, 103, and 104 in phase A; 111, 112, 113, 114 in phase B; coils 121, 122, 123, and 124 in phase C.

Turning to phase A of the second pole, coils 101, 102, 103 and 104 are present.

Continuing to the third pole, coils 201, 202, 203, and 204 are present for phase A; coils 211, 212, 213, and 214 are present for phase B; coils 221, 222, 223, and 224 present from phase C. Finally, the top of the fourth pole is shown at coils 301, 302, 303, 304 of phase A. The reader can continue the sequence though the requisite 96 slots.

In the parallel windings herein illustrated, each pole includes four separate windings per phase. The four separate windings divide themselves to a discrete parallel leg in accordance with two principles.

First, and in order to accommodate the flux density changes, each winding includes a coil from each pole. This approximately averages the variation in flux density along the length of the stator T of the linear pump.

Second, each parallel winding of each phase samples a coil devoted to that phase in a sequence that is permuted among the coils of successive phases at successive poles.

Taking the case of connection A1, it can be seen that it samples coil 1 in the first pole. Turning to the second pole, it can be seen that coil 102 is sampled. That is to say, the second in order coil is sampled. Going to the third pole, it can be seen that the third in sequence coil is sampled. That is to say, coil 203 is sampled. Finally, and referring to the fourth pole, coil 304 is sampled.

In this permutation, it will be realized that the coils in each power supply phase assigned to each pole will have varying time phases with respect to the power supply. Although these phases will differ one from another, by the expedient of permuting the order, we attain the same overall phase differential in each leg.

The reader can easily verify from FIG. 3 the continuum of variation. For example, the second parallel leg in phase A passes through coil 2, coil 103, coil 204 and finally coil 301 in the respective phase A illustration of the poles illustrated.

It will be appreciated that if the discrete coils have multiple strands, these discrete strands can either form parallel legs of their own or alternately be banded together. Likewise, although we have shown sequences in the order of 1, 2, 3, 4, the sequence can be varied. For example, the sequence 2, 3, 4, 1 would likewise do as well.

To avoid confusion, we have illustrated four parallel legs for phase A only. Phases B and C have been omitted. Their winding is precisely analogous.

We have illustrated as our preferred embodiment for the linear stator winding herein disclosed, the stator of a sodium pump. The reader will understand that other stators are included. For example, a linear stator used on a linear motor for driving tracked ground transportation could as well use the winding herein. In such devices, because of the voltage limitations of required solid state power controls, winding plans of linear stators substantially the same as that disclosed herein can be used. In the case of these windings, the central duct will be omitted. The winding would look substantially as the schematic of FIG. 3.

What is claimed is:

1. In a linear pump for pumping liquid sodium, the pump having a cylindrical stator, a cylindrical central duct concentrically fastened to said stator, a central magnetic field conducting core fastened central to said cylindrical central duct, said central magnetic field conducting core having a diameter less than the diameter of said cylindrical central duct whereby said cylindrical central duct and said central magnetic field conducting core define together an interstitial cylindrical pumping volume having an inlet and an outlet, means for conducting a magnetic field disposed in said stator about said central duct; and powered coil means spatially distributed in said means for conducting a magnetic field in said stator; the improvement is said powered coil means including:

a power supply having at least two alternating phases;

a group of coils in side by side relation along said stator and disposed around said central duct for generating a magnetic field to said means for conducting a magnetic field;

said coils defining at least three poles;

each said pole defined by a plurality of coils for each phase, said plurality of coils being in a sequential order and each having varying phase angles responsive to said power supply; and, a plurality of parallel connections, each parallel connection including at least one coil from one phase on each pole whereby flux variations along the central duct in said pumped sodium are averaged between said parallel connections; and, each parallel connection further including a permuted sample of the coils of each phase of each pole whereby differing phase angles from differing coils in differing poles are averaged in each parallel connection to reduce circulating currents in said parallel connections.

2. The invention of claim 1 and wherein said coils define at least eight poles and wherein each said pole is defined by four coils for each phase and wherein said power supply has three phases.

3. The invention of claim 2 and wherein said plurality of parallel connections includes four parallel connections for each phase.

4. In a linear stator disposed along a linear axis, said stator having a magnetic field conducting core disposed along said axis and a plurality of power winding means spatially distributed, along said axis across said linear axis in said means for conducting a magnetic field in said stator; the improvement in said power winding means including:

a power supply having at least two alternating phases;

a group of windings in side-by-side relation the length of said stator and crossing the linear axis of said stator for generating a magnetic field to said magnetic field conducting core;

said windings defining at least three poles;

each said pole defined by a plurality of windings for each phase, said plurality of windings for each phase being in sequential order and each having varying phase angles responsive to said power supply; and a plurality of parallel connections, each parallel connection including at least one winding from one phase on each pole whereby flux variations along the linear length of said stator are averaged between said parallel connections; and, each parallel connection further including a permuted sample of the windings of each phase of each pole whereby differing phase angles from differing windings in differing poles are averaged in each parallel connection to reduce circulating currents in said parallel connections.

5. The invention of claim 4 and wherein said windings comprise coils.

6. The invention of claim 5 and wherein said stator is disposed about a cylindrical duct.

* * * * *